United States Patent

Toshimitsu et al.

[11] Patent Number: 5,375,821
[45] Date of Patent: Dec. 27, 1994

[54] ENGINE MOUNT FOR MOTOR VEHICLES

[75] Inventors: Yasushi Toshimitsu; Tatsuhide Sakai, both of Utsunomiya; Ken Iinuma, Kawachi, all of Japan

[73] Assignee: Honda Giken Kogyo Kabushiki Kaisha, Tokyo, Japan

[21] Appl. No.: 120,373

[22] Filed: Sep. 14, 1993

[30] Foreign Application Priority Data

Sep. 14, 1992 [JP] Japan .................. 4-070482[U]

[51] Int. Cl.$^5$ .................. F16F 13/00; F16M 5/00
[52] U.S. Cl. .................. 267/140.12; 267/219; 180/312
[58] Field of Search .......... 267/140.12, 140.13, 267/141.1, 141.2, 219, 293; 180/297, 300, 312; 248/562, 566, 636

[56] References Cited

U.S. PATENT DOCUMENTS

| | | | |
|---|---|---|---|
| 3,730,462 | 5/1973 | Dick | 267/140.2 |
| 4,183,496 | 1/1980 | Brock et al. | 267/141.4 |
| 4,570,091 | 2/1986 | Kouishi | 267/140.13 |
| 4,749,173 | 6/1988 | Kauda | 267/140.12 |
| 4,895,353 | 1/1990 | Roth et al. | 267/140.12 |
| 5,129,479 | 7/1993 | Fujii et al. | |
| 5,156,379 | 10/1992 | Tabata | 267/140.12 |
| 5,221,077 | 6/1993 | Noguchi | 267/140.12 |

*Primary Examiner*—Andres Kashnikow
*Assistant Examiner*—Chris Schwartz
*Attorney, Agent, or Firm*—Armstrong, Westerman, Hattori, McLeland & Naughton

[57] ABSTRACT

An engine is supported on a frame of a motor vehicle by a plurality of engine mounts. At least one of said engine mounts are positioned on a main axis of inertia of the engine, and has substantially equal vertical and lateral static spring rates, a vertical dynamic spring rate greater than the vertical static spring rate, and a lateral dynamic spring rate between the vertical dynamic and static spring rates. The engine mount is effective in reducing muffled sound in the passenger compartment of the motor vehicle without impairing riding comfort of the motor vehicle. The spring rates are set to the following ratios:

$Ksz:Ksy:Kdy:Kdz = 1.0:1.0:1.3:1.9$.

5 Claims, 4 Drawing Sheets

ENGINE MOUNT FOR MOTOR VEHICLES

BACKGROUND OF THE INVENTION

1. Field of the Invention

The present invention relates to an engine mount for use in a motor vehicle such as an automobile.

2. Description of the Related Art

Motor vehicles such as automobiles give poor riding comfort when muffled sound is produced in the passenger compartment or the power plant resonates upon vibration of the engine. It has been customary to support the engine on a vehicle frame through resilient engine mounts in order to prevent the engine vibrations from being transmitted to the vehicle body.

The engine mounts have a relatively low spring rate to reduce muffled sound that is produced in the passenger compartment by engine vibrations at a high frequency ranging from 50 to 500 Hz with a small amplitude of ±0.05 mm, and a relatively high spring rate to improve poor riding comfort that is developed by engine vibrations at a low frequency ranging from 5 to 50 Hz with a large amplitude of ±1.0 mm.

The conventional engine mounts are designed to dampen only vertical vibrations, and hence suffer performance limitations. Specifically, if the vertical spring rate of an engine mount is lowered to minimize muffled sound in the passenger compartment, then the damping force of the engine mount is reduced accordingly, resulting in impaired riding comfort. Conversely, if the vertical spring rate of the engine mount is increased, then the passenger compartment is filled with more muffled sound.

In order to lower muffled sound in the passenger compartment, it would be possible to lower a lateral static spring rate for thereby reducing a lateral dynamic spring rate. According to such a solution, since the lateral static spring rate would be lowered in consideration of the lateral dynamic spring rate, it would not be considered and determined solely for itself. While the engine mount thus designed signed would be effective to reduce muffled sound in the passenger compartment, its rigidity for supporting the power plant would be lowered, making the riding comfort poor.

SUMMARY OF THE INVENTION

It is therefore an object of the present invention to provide an engine mount which takes into account a lateral static spring rate as well as a lateral dynamic spring rate for achieving both reduced muffled sound in the passenger compartment and improved riding comfort.

According to the present invention, there is provided an engine mount assembly for supporting an engine on a frame of a motor vehicle, comprising a plurality of engine mounts supporting the engine on the frame of the motor vehicle, at least one of the engine mounts being positioned on a main axis of inertia of the engine and having substantially equal vertical and lateral static spring rates, a vertical dynamic spring rate greater than the vertical static spring rate, and a lateral dynamic spring rate between the vertical dynamic and static spring rates.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

The terms "vertical", "lateral", "longitudinal", and "transversely" are used herein with respect to a motor vehicle on which an engine mount according to the present invention is used.

Figure 1:
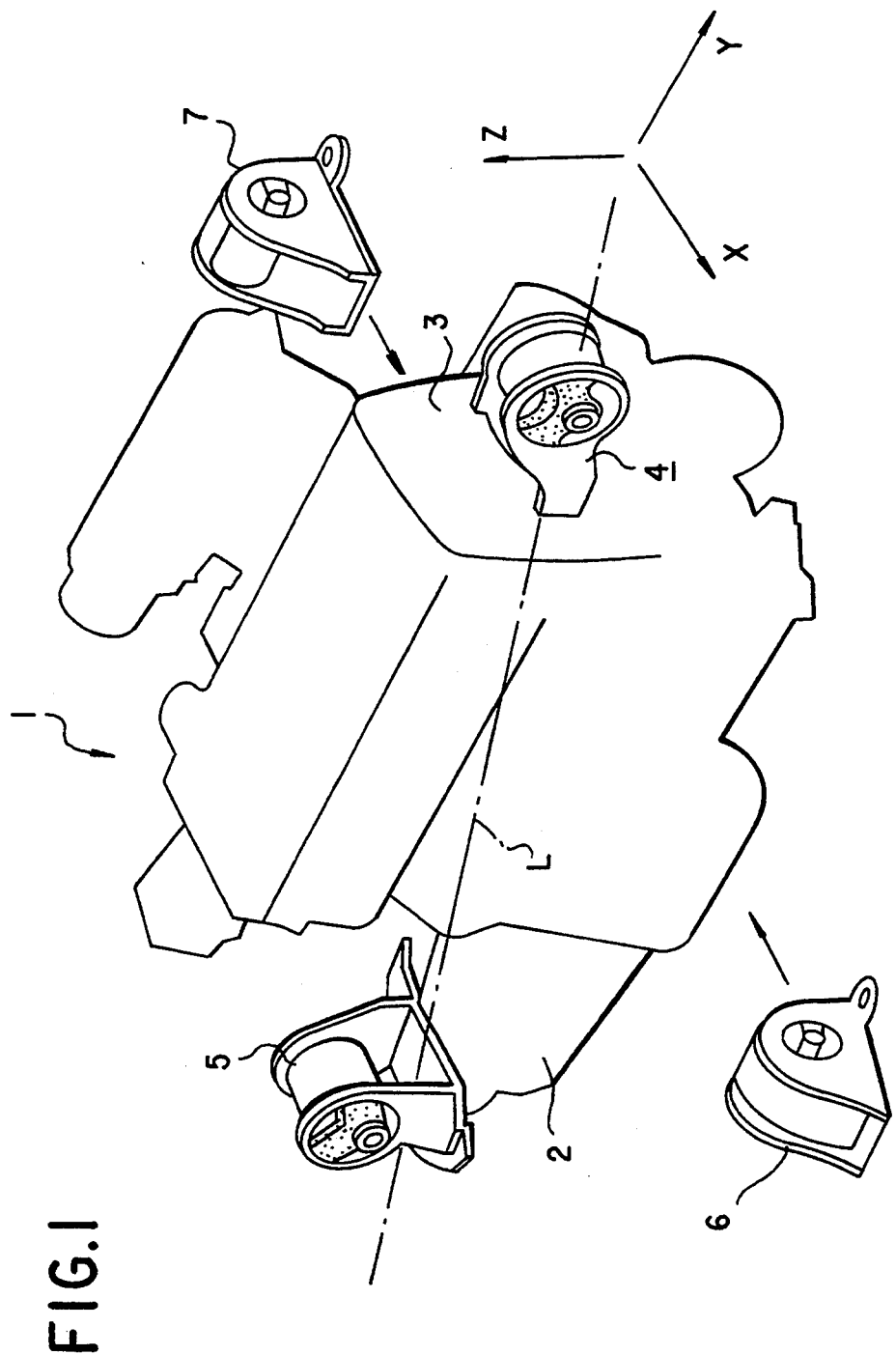
FIG. 1 is a perspective view of an engine for use on a motor vehicle.

As shown in FIG. 1, an engine 1 for use on a motor vehicle such as an automobile may typically be a four-cylinder engine used in a front engine, front drive (FF) configuration with the crankshaft extending transversely of the motor vehicle. The engine 1 is combined with a transmission 2 joined to a lower portion of the engine 1 and has a cylinder head 3. The engine 1 has a main axis L of inertia and is oriented as shown with respect to a longitudinal direction X of the motor vehicle, a transverse direction Y of the motor vehicle, and a vertical direction Z of the motor vehicle.

The engine 1 is supported on a vehicle frame (not shown) by a plurality of engine mounts 4, 5, 6, 7. The engine mount 4 is positioned on the main axis L of inertia and attached to the cylinder head 3. The engine mount 5 is positioned on the main axis L of inertia and attached to the transmission 2. The engine mount 6 is attached to a front side of the engine 1 near the transmission 2, and the engine mount 6 is attached to a rear side of the engine 1 near the transmission 2.

The engine mounts 4, 5, 6, 7 are identical in structure and function to each other. Therefore, only the engine mount 4 will be described below by way of example.

Figure 2:
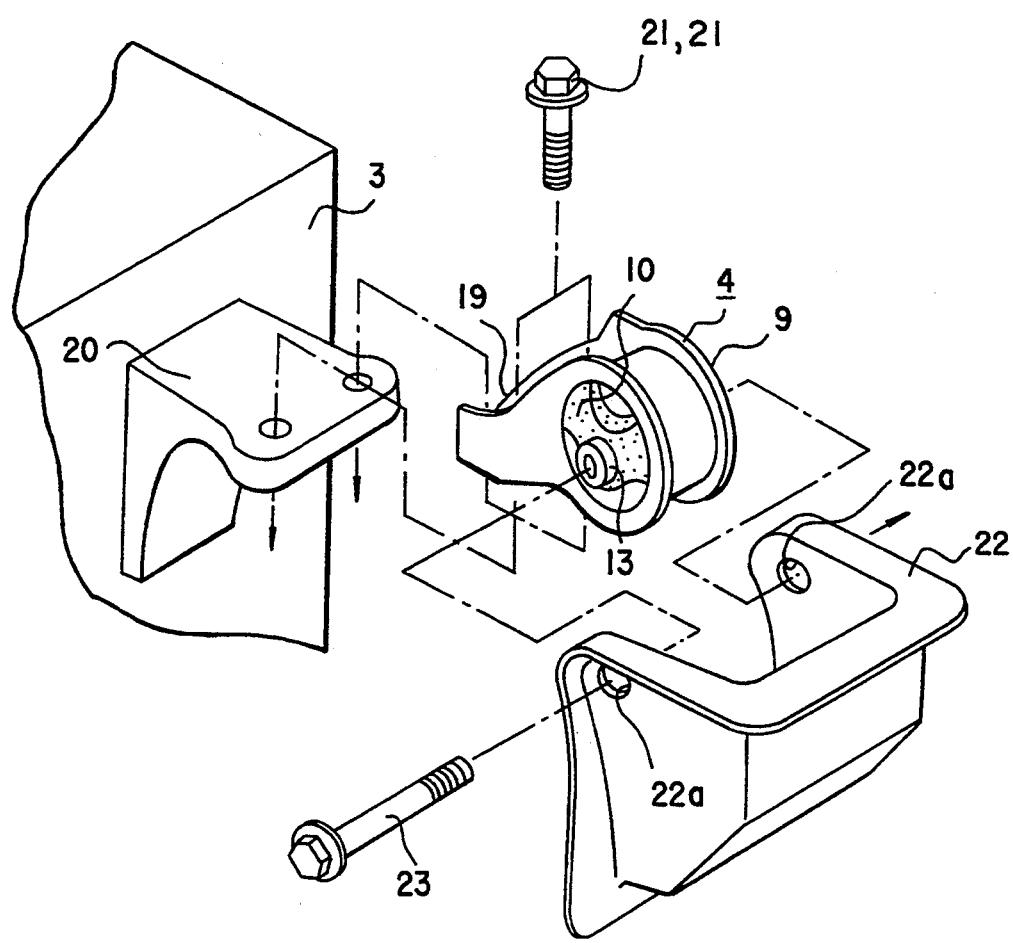
FIG. 2 is an exploded perspective view of an engine mount as it is attached to the engine.
Figure 3:
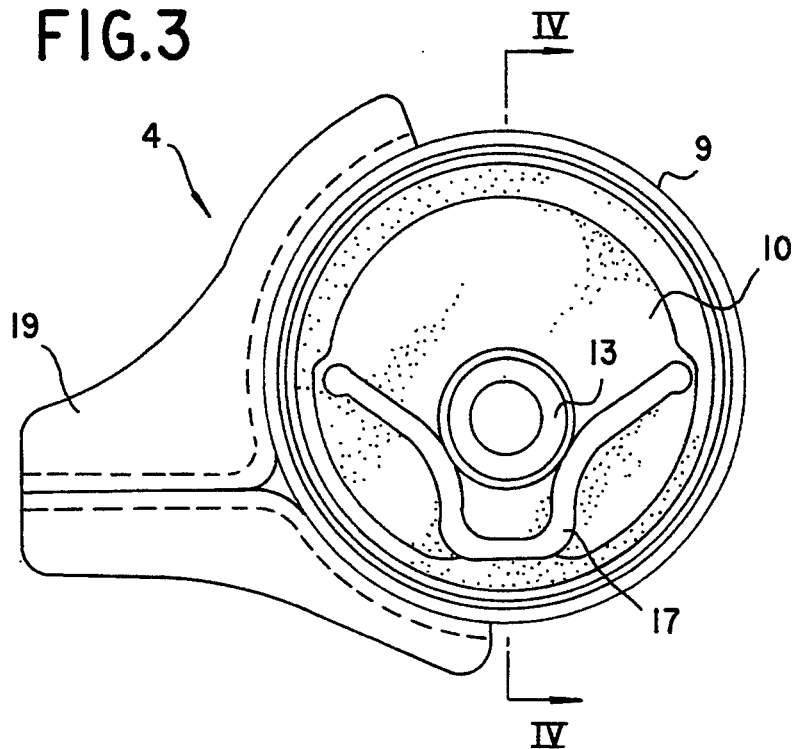
FIG. 3 is an enlarged side elevational view of the engine mount.

As shown in FIGS. 2 and 3, the engine mount 4 has an outer tube 9 housing therein a resilient member 10 made of a resilient material such as rubber. The resilient member 10 has its outer surface securely bonded to the inner circumferential surface of the outer tube 9.

Figure 4:
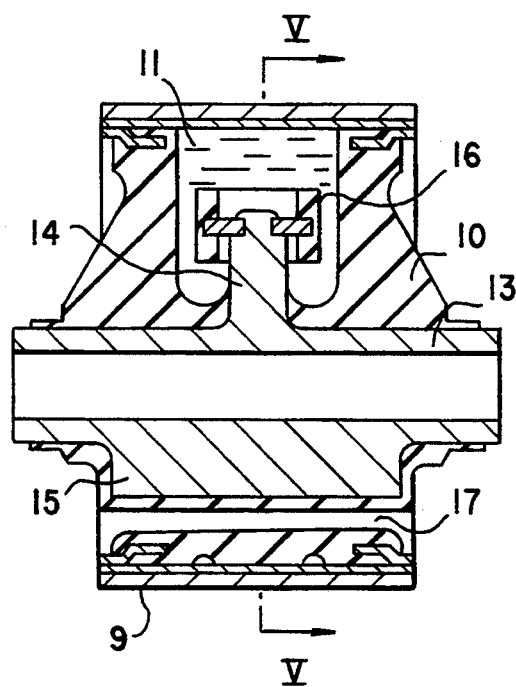
FIG. 4 is a cross-sectional view taken along line IV—IV of FIG. 3.
Figure 5:
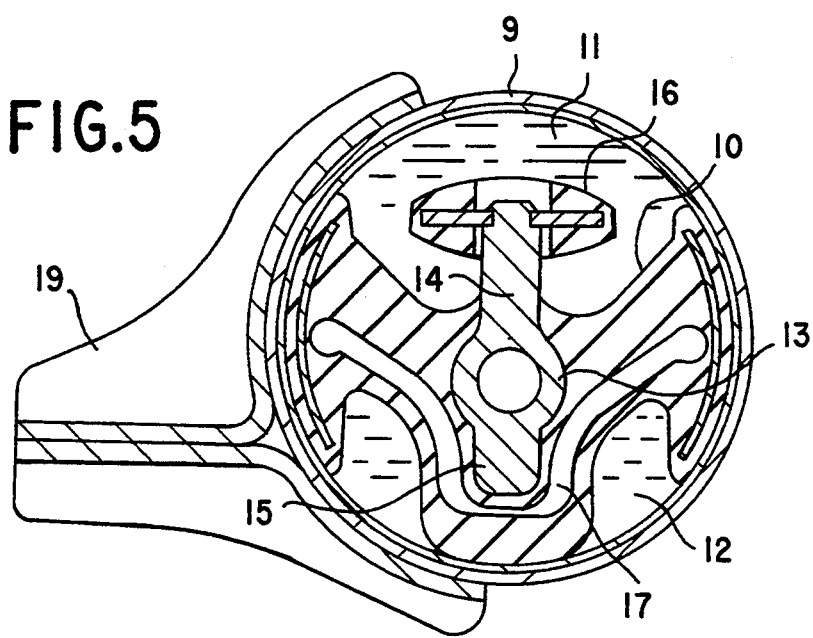
FIG. 5 is a cross-sectional view taken along line V—V of FIG. 4.

As shown in FIGS. 4 and 5, the resilient member 10 has fluid chambers 11, 12 defined therein and communicating with each other through a communication passage (not shown). The fluid chambers 11, 12 are filled with a fluid. An inner tube 13 is embedded substantially centrally in the resilient member 10. The inner tube 13 has an axis extending parallel to the axis of the outer tube 9, and has its opposite ends extending axially beyond the axial ends of the outer tube 9. The inner tube 13 has upward and downward extensions 14, 15 integral therewith. The upward extension 14 projects upwardly into the fluid chamber 11. A resonant device 16 capable of causing the fluid sealed in the fluid chamber 11 to resonate is mounted on the upper end of the upward extension 14. The resonant device 16 doubles as a stopper that is engageable with the outer tube 9 to limit elastic deformation of the resilient member 10. The resilient member 10 has a space or gap 17 defined therein and extending in an upwardly concave curved shape below the downward projection 15. The space 17 has opposite ends extending closely to the outer tube 9.

As shown in FIGS. 2, 3, and 5, a radially outwardly extending support arm 19 is attached to the outer tube 9. As shown in FIG. 2, the support arm 19 fastened to a bracket 20 fixed to the cylinder head 3 by a pair of bolts 21, thus attaching the engine mount 4 to the cylinder head 3. Another bracket 22 fixed to the vehicle frame has a pair of aligned holes 22a defined therein. The engine mount 4 is also attached to the vehicle frame through the bracket 22 by a bolt or support shaft 23 that extends through the holes 22a and the inner tube 13.

At least the engine mount 4 of all the engine mounts is constructed so as to have substantially equal vertical and lateral static spring rates, a vertical dynamic spring rate greater than the vertical static spring rate, and a lateral dynamic spring rate between the vertical dynamic and static spring rates.

Specifically, if it is assumed that the vertical static spring rate is indicated by Ksz, the lateral static spring rate by Ksy, the lateral dynamic spring rate by Kdy, and the vertical dynamic spring rate by Kdz, then these spring rates are set to the following ratios:

$$Ksz:Ksy:Kdy:Kdz = 1.0:1.0:1.3:1.9.$$

The individual spring rates may be in the following ranges:
Ksz:Ksy = 1.0:0.8 or more,
Ksy:Kdy = 1.0:1.3 or less, and
Kdy:Kdz = 0.8 or less:1.0.

The ratios of the spring rates of the conventional engine mounts are as follows:

$$Ksz:Ksy:Kdy:Kdz = 1.0:1.4:2.1:2.1.$$

It can be understood that the lateral dynamic spring rate Kdy of the engine mount according to the present invention is lower than that of the conventional engine mount, whereas the lateral static spring rate Ksy of the engine mount according to the present invention remains substantially the same as that of the conventional engine mount.

Since the lateral static spring rate Ksy remains substantially the same, the engine mount according to the present invention maintains a required rigidity for supporting the power plant to prevent riding comfort from being impaired. At the same time, the lateral dynamic spring rate Kdy is lowered to reduce muffled sound which is produced in the passenger compartment of the motor vehicle due to vibrations at high frequencies with small amplitudes.

Figure 6:
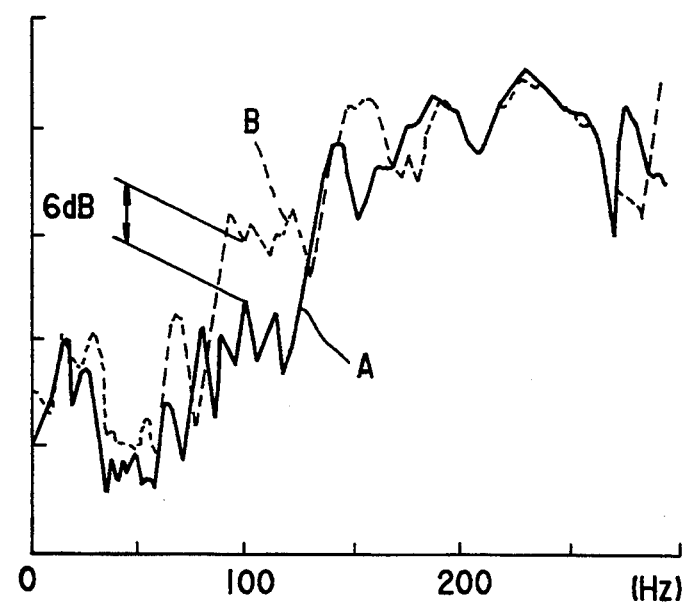
FIG. 6 is a graph showing the sound pressure levels of muffled sounds produced in a passenger compartment when the engine mount according to the present invention and the conventional engine mount are employed.

FIG. 6 illustrates pressure sound levels of muffled sound which are produced in the passenger compartment when the engine mount according to the present invention and the conventional engine mount are employed. The solid-line curve A represents the sound pressure level of muffled sound produced in the passenger compartment when the engine mount according to the present invention is employed. The broken-line curve A represents the sound pressure level of muffled sound produced in the passenger compartment when the conventional engine mount is employed. The graph shown in FIG. 6 clearly indicates that the engine mount according to the present invention can lower the sound pressure level of muffled sound in the passenger compartment, particularly by 6 dB or more in the vicinity of 100 Hz.

As described above, since the vertical and lateral static spring rates of the engine mount are substantially equal to each other, the engine mount can maintain a required lateral rigidity for supporting the power plant, thus preventing riding comfort from being impaired due to resonance of the power plant. Inasmuch as the lateral dynamic spring rate is of a value between the vertical dynamic and static spring rates, the lateral dynamic spring rate may be of a relatively low value for minimizing muffled sound in the passenger compartment.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. An engine mount assembly for supporting an engine on a frame of a motor vehicle, comprising:
a plurality of engine mounts supporting an engine on a frame of a motor vehicle, at least one of said engine mounts being positioned on a main axis of inertia of the engine;
said at least one of the engine mounts having substantially equal vertical and lateral static spring rates, a vertical dynamic spring rate greater than the vertical static spring rate, and a lateral dynamic spring rate between the vertical dynamic and static spring rates.

2. An engine mount assembly according to claim 1, wherein said engine has a longitudinal axis extending transversely of the motor vehicle.

3. An engine mount assembly according to claim 1, wherein other one of said engine mounts is positioned substantially on said main axis of inertia of said engine.

4. An engine mount assembly according to claim 1, wherein the vertical static spring rate is indicated by Ksz, the lateral static spring rate by Ksy, the lateral dynamic spring rate by Kdy, and the vertical dynamic spring rate by Kdz, and these spring rates are in the following ranges:
Ksz:Ksy = 1.0:0.8 or more,
Ksy:Kdy = 1.0:1.3 or less, and
Kdy:Kdz = 0.8 or less:1.0.

5. An engine mount assembly according to claim 4, wherein the spring rates are set to the following ratios:
Ksz:Ksy:Kdy:Kdz = 1.0:1.0:1.3:1.9.

* * * * *